United States Patent
Noguchi et al.

(10) Patent No.: US 10,633,894 B2
(45) Date of Patent: Apr. 28, 2020

(54) SMART ENTRY SYSTEM

(71) Applicant: HONDA MOTOR CO., LTD., Minato-ku, Tokyo (JP)

(72) Inventors: Junpei Noguchi, Wako (JP); Katsuyasu Yamane, Wako (JP); Takashi Mori, Wako (JP); Masayuki Yamazaki, Wako (JP); Akaradej Sawaengsap, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 369 days.

(21) Appl. No.: 14/939,066

(22) Filed: Nov. 12, 2015

(65) Prior Publication Data
US 2016/0138305 A1    May 19, 2016

(30) Foreign Application Priority Data

Nov. 13, 2014    (JP) .................................. 2014-230575

(51) Int. Cl.
*E05B 81/58*    (2014.01)
*E05B 81/78*    (2014.01)
(Continued)

(52) U.S. Cl.
CPC .............. *E05B 81/58* (2013.01); *B60R 25/24* (2013.01); *E05B 81/77* (2013.01); *E05B 81/78* (2013.01);
(Continued)

(58) Field of Classification Search
None
See application file for complete search history.

(56) References Cited

U.S. PATENT DOCUMENTS

2005/0253684 A1    11/2005  Kumazaki et al.
2007/0023265 A1*    2/2007  Ishikawa ................. E05B 81/78
                                                              200/61.62
(Continued)

FOREIGN PATENT DOCUMENTS

JP    2005-325542 A    11/2005
JP    2006-266023 A    10/2006
JP    5311083 B2    10/2013

OTHER PUBLICATIONS

Office Action dated May 18, 2017, issued in counterpart Chinese Application No. 201510736631.4, with English translation (17 pages).
(Continued)

*Primary Examiner* — Curtis A Kuntz
*Assistant Examiner* — Shawna M Kingston
(74) *Attorney, Agent, or Firm* — Westerman, Hattori, Daniels & Adrian, LLP

(57) ABSTRACT

A smart entry system includes a driver seat unlock sensor and a centralized control unit. The driver seat unlock sensor is provided in the vicinity of the door handle of the door of the driver seat of a vehicle to detect an intention of an operator of unlocking. The centralized control unit, when detecting an operation of the driver seat unlock sensor and establishment of communication with a mobile device carried by the operator in a predetermined communication range in the vicinity of the vehicle, unlocks a driver seat door lock. The centralized control unit, when detecting an operation of the driver seat unlock sensor for less than a predetermined time, unlocks only the driver seat door lock. The centralized control unit, when detecting an operation of the driver seat unlock sensor for the predetermined time or more, unlocks all the door locks.

7 Claims, 3 Drawing Sheets

(51) Int. Cl.
*B60R 25/24* (2013.01)
*E05B 81/04* (2014.01)
*E05B 47/00* (2006.01)
*E05B 17/10* (2006.01)
*E05B 17/00* (2006.01)
*E05B 81/00* (2014.01)
*E05B 81/76* (2014.01)

(52) U.S. Cl.
CPC .......... *E05B 17/0083* (2013.01); *E05B 17/10* (2013.01); *E05B 81/01* (2013.01); *E05B 81/04* (2013.01); *E05B 2047/0067* (2013.01)

(56) References Cited

U.S. PATENT DOCUMENTS

2007/0171057 A1* 7/2007 Ogino .................. B60R 25/246
                                                340/545.7
2013/0130674 A1* 5/2013 De Wind ............. B60Q 1/2619
                                                455/420

OTHER PUBLICATIONS

Office Actioin dated Aug. 30, 2016, issued in counterpart Japanese Application No. 2014-230575 (3 pages).

* cited by examiner

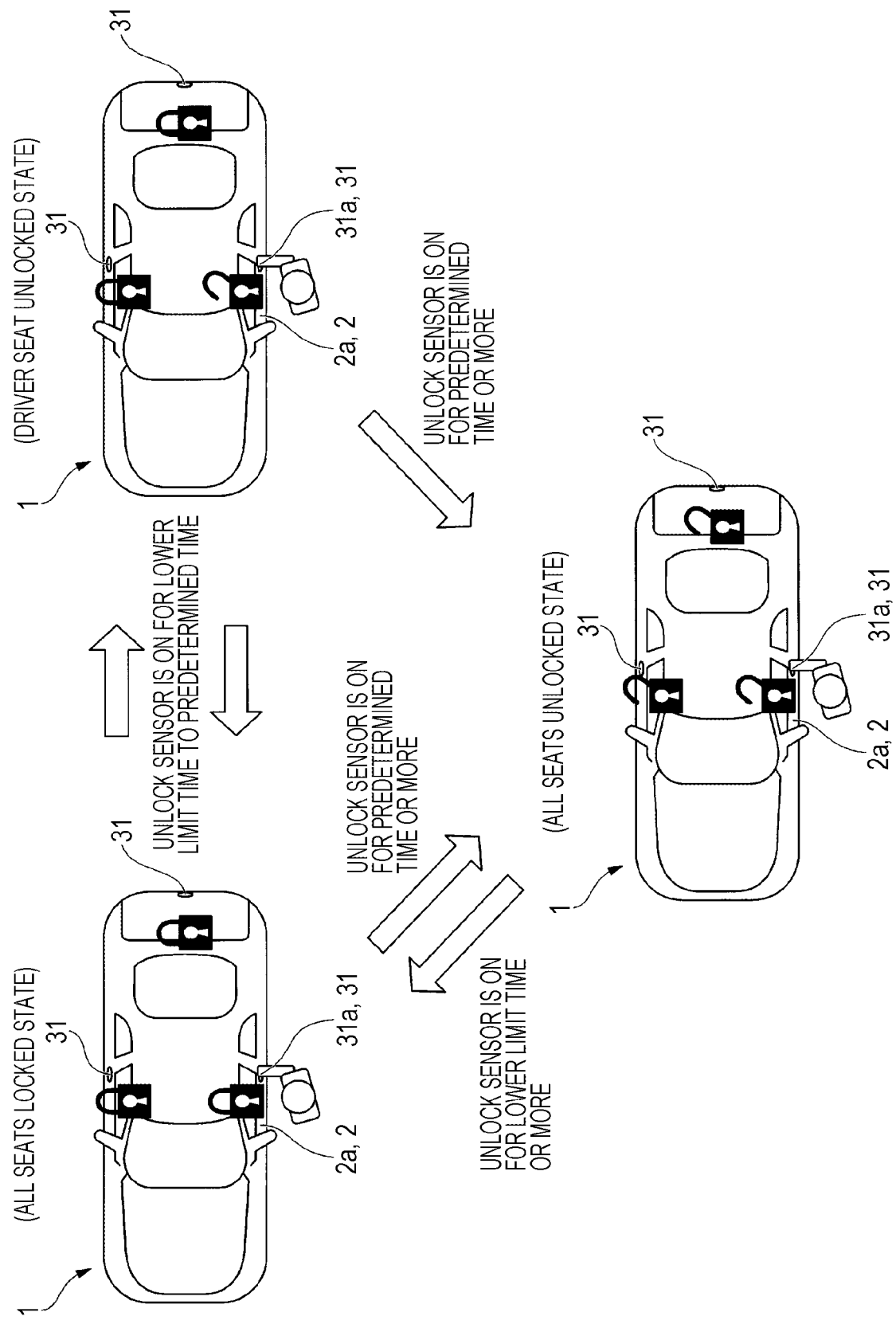

SMART ENTRY SYSTEM

CROSS REFERENCES TO RELATED APPLICATIONS

The present application claims priority under 35 U.S.C. §119 to Japanese Patent Application No. 2014-230575, filed Nov. 13, 2014, entitled "Smart Entry System." The contents of this application are incorporated herein by reference in their entirety.

BACKGROUND

1. Field

The present disclosure relates to a smart entry system.

2. Description of the Related Art

In the related art, a smart entry system is known that includes a touch sensor provided inwardly of the door handle at the driver seat door of a vehicle, and a mechanical switch provided in the vicinity of the door handle (see, for instance, Japanese Patent No. 5311083). In a locked state of the driver seat door, the smart entry system selectively unlocks the locked state of the driver seat door by an operation of the touch sensor, and unlocks locked state of at least one door other than the driver seat door by an operation of the mechanical switch within a subsequent predetermined time. Also, in locked state of the driver seat door, the smart entry system selectively unlocks the locked state of the driver seat door by a single operation of the mechanical switch, and unlocks locked state of at least one door other than the driver seat door by a second operation of the mechanical switch within a subsequent predetermined time.

SUMMARY

However, when a door is unlocked according to a combination of operations of the touch sensor and the mechanical switch in the smart entry system in the related art, there is a problem in that a plurality of operation objects in different operational manners needs to be operated and thus the operation is difficult to understand. Also, when a door is unlocked according to an operation of the mechanical switch, there is a problem in that it is difficult to feel a predetermined time set between the first operation and the second operation. For instance, when locked state of the driver seat door is once unlocked by the first operation, then a predetermined time elapses and the second operation of a mechanical switch is performed, the driver seat door is locked again, which results in a state different from the intention of an operator and causes a problem in that convenience is lost.

The present disclosure has been made in view of the above-mentioned circumstances, and provides a smart entry system that is capable of appropriately reflecting the intention of an operator to unlocked and locked state of each of the doors of a vehicle.

In order to solve the aforementioned problem, the present disclosure has adopted the following aspects:

(1) A smart entry system according to an aspect of the present disclosure includes: an unlock sensor (for instance, the driver seat unlock sensor 31*a* in the embodiment) that is provided to a door handle (for instance, the door handle 3*a* in the embodiment) of a door (a first door, for instance, the door 2*a* in the embodiment) of a driver seat of a vehicle and that detects an intention of a user (typically, a driver of the vehicle) of unlocking (which typically includes a contact of the user's hand with a surface of the door handle or any pressure on the door handle caused by the contact or any other operation related to the unlocking action, and these actions are referred to as an "operation" by the user for unlocking the door); and a control unit (a controller configured to determine a period of time during which the operation by the user for unlocking the door is detected, for instance, the centralized control unit 39 in the embodiment), when detecting an operation of the unlock sensor and detecting establishment of communication with a mobile device (for instance, the mobile device 11 in the embodiment) carried by the user in a predetermined communication range in a vicinity of the vehicle, unlocks a locking mechanism (for instance, the driver seat door lock 40*a* in the embodiment) of the door of the driver seat. The control unit, when detecting an operation of the unlock sensor for less than a predetermined time (i.e., the detection time is less than the predetermined time), unlocks only a locking mechanism of the door of the driver seat, and the control unit, when detecting an operation of the unlock sensor for the predetermined time or more (i.e., the detection time is the predetermined time or more), unlocks locking mechanisms of all doors of the vehicle including the door for driver seat and other doors for passenger seats (second doors). With the smart entry system according to (1) described above, it is possible to clearly determine the intention of a user as to switching to unlocking only the driver seat or all the seats while using the same switch (unlock sensor). Thereby, it is possible to ensure operability which is easy to understand for a user and in which the intention of the user and the behavior of the vehicle do not differ.

(2) In the smart entry system according to (1) described above, the control unit, when detecting an operation of the unlock sensor (for instance, the front passenger seat unlock sensor 31*b*, the backdoor unlock sensor in the embodiment) provided in a vicinity of a door handle (for instance, the door handle 3 in the embodiment) of a door (for instance, the door 2 in the embodiment) of a seat other than the driver seat of the vehicle and detecting establishment of predetermined communication with the mobile device carried by the user of the vehicle in a predetermined communication range in a vicinity of a door where the operation is detected, may unlock the locking mechanisms of all doors of the vehicle irrespective of whether the predetermined time has elapsed. Furthermore, in (2) described above, usability at places other than the driver seat such as loading and unloading of baggage may be improved while the security performance for unlocking doors is ensured.

(3) In the smart entry system according to (1) or (2) described above, the control unit may determine that the predetermined time has elapsed when an accumulation value reaches the predetermined time, the accumulation value being calculated by performing addition while the unlock sensor is in an operative condition or performing subtraction while the unlock sensor is in a non-operative condition. Furthermore, in (3) described above, even when detection of an operative condition is momentarily lost due to noise or momentarily reduced contact pressure, it is possible to protect against resetting operation time extension. Thereby, even after detection of an operative condition is momentarily lost, when the operation is continued, a predetermined time may be immediately reached and desired operativity may be ensured.

(4) The smart entry system according to any one of (1) to (3) described above includes: a mobile device verification unit (for instance, the smart control unit 33 in the embodiment) that periodically verifies presence of the mobile device in a predetermined communication range in a vicinity of the door of the driver seat; and door handle illumination units (for instance, the door handle illumination lights 41 in the embodiment) that illuminate vicinities of door handles of the vehicle. The control unit, when confirming that a door including at least the door of the driver seat is in a locked state and confirming that the mobile device is present in the predetermined communication range in the vicinity of the door of the driver seat by the mobile device verification unit, may cause only one of the door handle illumination units (for instance, the driver seat door handle illumination light 41*a* in the embodiment) of the door handle of the driver seat to light up, and subsequently the control unit, when detecting an operation of the unlock sensor provided in the vicinity of the door handle of the door of the driver seat for the predetermined time or more, may cause a door handle illumination unit (for instance, the front passenger seat door handle illumination light 41*b*, the backdoor handle illumination light in the embodiment) of a door handle of a seat other than the driver seat to light up. Furthermore, in (4) described above, when welcome treat is provided by the door handle illumination, only the driver seat door is lit up at normal time. When it is estimated that an occupant also get on through another door, welcome illumination is also provided by another door handle, and thus both power saving at normal time and hospitality for another occupant are achieved.

(5) The smart entry system according to any one of (1) to (4) described above further includes a seat warming unit (for instance, the seat heaters 42 in the embodiment) that warms each of a plurality of seats of the vehicle. The control unit, when detecting an operation of the unlock sensor for the predetermined time or less, may cause unlock operation of the driver seat to be performed and the seat warming unit (for instance, the driver seat heater 42*a* in the embodiment) of only the driver seat to operate, and the control unit, when detecting an operation of the unlock sensor for the predetermined time or more, may cause the seat warming unit for all seats to operate. Furthermore, in (5) described above, both power saving and hospitality for another occupant are achieved.

(6) In the smart entry system according to any one of (1) to (5) described above, the control unit may have a customization unit (for instance, the input unit 38 or the mobile device 11, and the centralized control unit 39 in the embodiment) that changes a setting value for a setting item including at least one of the predetermined time and a control mode of the locking mechanism of the door according to the predetermined time, using a meter of the vehicle or a mobile terminal communicable with the vehicle. Furthermore, in (6) described above, the setting value is customizable by a user, and thus easy-to-understand setting for a user is made possible.

(7) In the smart entry system according to (6) described above, the customization unit may have an item that allows individual setting of private mode under a precondition that only the user uses the vehicle and public mode under a precondition that an individual other than the user uses the vehicle, and the control unit, when detecting an operation of the unlock sensor for less than the predetermined time, may cause an operation in the private mode, and when detecting an operation of the unlock sensor for the predetermined time or more, may cause an operation in the public mode. Furthermore, in (7) described above, when it is estimated that an occupant other than the driver is present, the mode is switched to the public mode, and thus even when highly hobby-like setting is made in customized items, such as types of voice guidance, there is no possibility of giving a sense of discomfort to another occupant.

(8) In the smart entry system according to any one of (1) to (7) described above, the vehicle may include an answer back unit that performs answer back to the user who is present outside the vehicle by a visible operation or an audible operation in a recognizable manner to the operator, and the control unit may cause the answer back unit to operate when an operation confirmation time has elapsed, which is shorter than the predetermined time and which allows the detection of an operation of the unlock sensor for less than the predetermined time to be effective, and the control unit may cause the answer back unit to operate again when the predetermined time has elapsed. Furthermore, in (8) described above, a user is able to recognize that input to an unlock sensor is confirmed due to elapse of the operation confirmation time and the detail of unlock operation is switched due to elapse of the predetermined time. Consequently, the operability is further more reliably ensured in which the intention of a user and the behavior of the vehicle do not differ.

BRIEF DESCRIPTION OF THE DRAWINGS

FIG. 3 is a schematic diagram illustrating the operation of the smart entry system according to the embodiment of the present disclosure.

DESCRIPTION OF THE PREFERRED EMBODIMENTS

Hereinafter, a smart entry system according to an embodiment of the present disclosure will be described with reference to the accompanying drawings.

Figure 1:
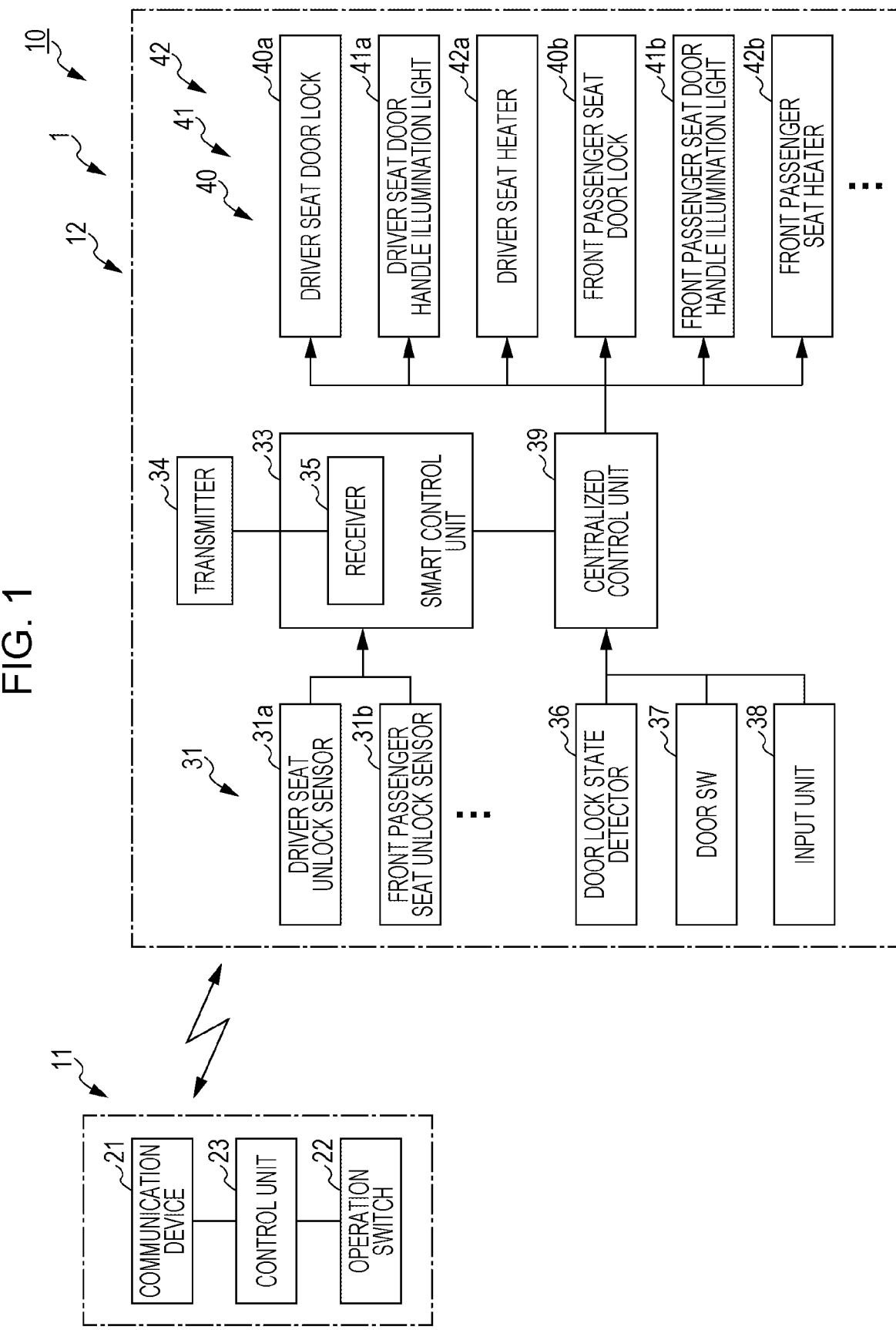
FIG. 1 is a block diagram illustrating the configuration of a smart entry system according to an embodiment of the present disclosure.

As illustrated in FIG. 1, a smart entry system 10 according to the embodiment includes a mobile device 11 that functions as an electronic key of a vehicle 1, and an in-vehicle system 12 mounted on the vehicle 1. The mobile device 11 is a communication terminal carried by a driver of the vehicle 1. The mobile device 11 performs wireless communications with the in-vehicle system 12. The mobile device 11 transmits a response signal that is responded to a request signal transmitted from the in-vehicle system 12, and a command signal that commands a predetermined in-vehicle device to operate along with specific identification information. The mobile device 11 commands a drive source (such as internal-combustion engine or a motor) of the vehicle 1 to start or stop, and doors 2 to lock or unlock by the drive of the later-described door lock 40 of the vehicle 1.

The mobile device 11 includes a communication device 21, an operation switch 22, and a control unit 23. The communication device 21 performs wireless communication with the later-described transmitter 34 and receiver 35. The communication device 21 receives a low frequency (LF) signal by an LF antenna (not illustrated), the LF signal being periodically transmitted from the transmitter 34 of the in-vehicle system 12. The mobile device 11 transmits a radio frequency (RF) signal to the receiver 35 of the in-vehicle system 12 by a RF antenna (not illustrated). The operation switch 22 receives input operation of an operator and outputs a signal (for instance, a command signal that commands a predetermined in-vehicle device to operate) according to the input operation.

The control unit 23 controls the operation of the mobile device 11 comprehensively. When the communication device 21 receives a request signal which is an LF signal intermittently transmitted from the in-vehicle system 12, the control unit 23 determines whether or not the request signal is a proper request signal. The control unit 23, when determining that the received request signal is a proper request signal, commands the communication device 21 to transmit to the in-vehicle system 12 a response signal which is a RF signal having specific identification information as a response to the request signal. When a command signal commanding a predetermined in-vehicle device to operate is outputted from the operation switch 22, the control unit 23 commands the communication device 21 to transmit the command signal to the in-vehicle system 12.

The in-vehicle system 12 includes a plurality of unlock sensors 31 (a driver seat unlock sensor 31a, a front passenger seat unlock sensor 31b, a backdoor unlock sensor, . . . ), a smart control unit 33, the transmitter 34, the receiver 35, a door lock state detector 36, a door switch 37, an input unit 38, and a centralized control unit 39, a plurality of door locks 40 (a driver seat door lock 40a, a front passenger seat door lock 40b, a backdoor lock, . . . ), a plurality of door handle illumination lights 41 (a driver seat door handle illumination light 41a, a front passenger seat door handle illumination light 41b, a backdoor handle illumination light, . . . ), and a plurality of seat heaters 42 (a driver seat heater 42a, a front passenger heater 42b, . . . ).

Figure 2:
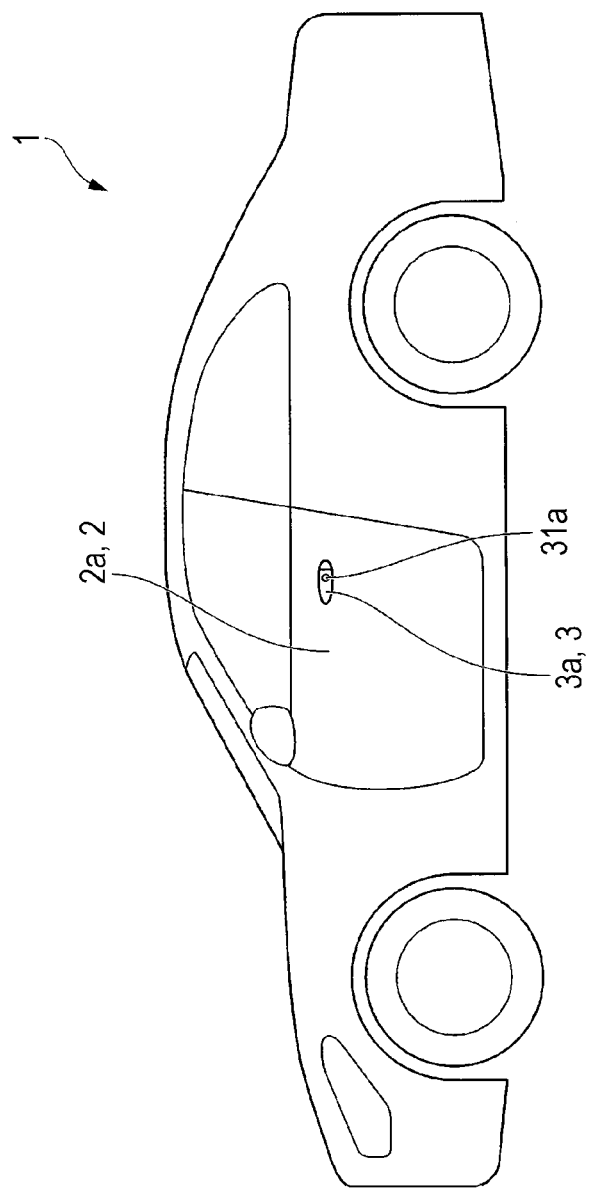
FIG. 2 is a view of a vehicle seen from the outside thereof in the right and left direction of the vehicle that is equipped with the smart entry system according to the embodiment of the present disclosure.

Each of the plurality of unlock sensors 31 is disposed in a corresponding one of the vicinities of door handles 3 of the doors 2 of the vehicle 1. As illustrated in FIG. 2, the driver seat unlock sensor 31a is disposed on the outer surface of the door handle 3a of the door 2a of the driver seat. The front passenger seat unlock sensor 31b is disposed on the outer surface of the door handle 3 (not illustrated) of the door 2 (not illustrated) of the front passenger seat. The backdoor unlock sensor (not illustrated) is disposed on the outer surface of the door handle 3 (not illustrated) of the back door (backdoor) 2. Each of the plurality of unlock sensors 31 is a mechanical switch that detects a pressing operation, for instance, by a finger of an operator. Each of the unlock sensors 31 outputs a signal to command the door 2 to unlock according to a pressing operation of an operator. Thus each of the unlock sensors 31 detects an intention of the operator to unlock the door 2.

The smart control unit 33 is connected to the centralized control unit 39 or the like in a communicable manner via, for instance, a CAN communication line which is a general-purpose communication line. The smart control unit 33 controls wireless communications between the transmitter 34, the receiver 35, and the mobile device 11. The transmitter 34 includes an LF antenna provided in each of a plurality of door handles 3. The receiver 35 includes a RF antenna built in the smart control unit 33. The smart control unit 33 periodically transmits a request signal as an LF signal from the transmitter 34 to a peripheral predetermined communication range. When the receiver 35 receives from the mobile device 11 a response signal as a RF signal responded to a request signal, the smart control unit 33 compares the identification information included in the response signal with pre-stored identification information. When the received identification information matches the stored identification information, the smart control unit 33 detects the establishment of communication between the mobile device 11 and the transmitter 34, the receiver 35, and authenticates that the operator who carries the mobile device 11 is an authorized operator. After it is authenticated that the operator of the mobile device 11 is an authorized operator, when receiver 35 receives a command signal which is outputted from the mobile device 11 and commands a predetermined in-vehicle device to operate, the smart control unit 33 transmits the command signal to the centralized control unit 39. The smart control unit 33, when receiving a signal (signal of an unlock request and a lock request for the door 2) outputted from each of the plurality of unlock sensors 31, transmits the signal to the centralized control unit 39.

For each of the doors 2, the door lock state detector 36 outputs a signal of the position information (that is, information on unlocked or locked state of doors 2) of an operation member (not illustrated) with which the door locks 40 are mechanically driven by an operation of an operator. The door switch (door SW) 37 outputs a signal of opening and closing information on each of the doors 2. The input unit 38 receives an input operation of an operator and outputs a signal according to the input operation. The input unit 38 is, for instance, a switch (not illustrated) that changes various types of settings using a multi information display (not illustrated) of the vehicle 1.

The centralized control unit 39 includes a processor such as a CPU, a ROM that stores programs, and a RAM that temporarily stores data. The centralized control unit 39 along with the smart control unit 33 constitutes what is called a body control module (BCM). The centralized control unit 39 comprehensively controls the operations of various types of in-vehicle devices. The centralized control unit 39 controls the door locks 40, the door handle illumination lights 41, and the seat heaters 42 according to a signal outputted from the smart control unit 33 and a signal outputted from each of the door lock state detector 36 and the door switch 37.

Each of the door locks 40 includes a door locking mechanism (not illustrated) that unlocks and locks the door 2, and a door lock motor (not illustrated) that drives the door locking mechanism. The door 2a of the driver seat, the door 2 of the front passenger seat, and the backdoor 2 are provided with the driver seat door lock 40a, the front passenger seat door lock 40b, and the backdoor lock, respectively. The door handle illumination lights 41 illuminate respective vicinities of the door handles 3. The door handle 3a of the driver seat, the door handle 3 of the front passenger seat, and the door handle 3 of the backdoor 2 are provided with the driver seat door handle illumination light 41a, the front passenger seat door handle illumination light 41b, and the backdoor handle illumination light, respectively. The seat heaters 42 warm the seats, respectively. The driver seat heater 42a and the front passenger seat heater 42b warm the driver seat and the front passenger seat, respectively.

The smart entry system 10 according to the embodiment has the aforementioned configuration. Next, an example of an operation of the smart entry system 10 will be described.

The centralized control unit 39, when detecting an operation of the driver seat unlock sensor 31a and detecting establishment of communication between the mobile device 11 carried by an operator and the transmitter 34, the receiver 35 in a predetermined communication range in the vicinity of the vehicle 1 is detected in a state where all the doors 2 are detected to be locked, unlocks the driver seat door lock 40a at the door 2a of the driver seat. As illustrated in FIG. 3, the centralized control unit 39, when detecting an operation of the driver seat unlock sensor 31a for a lower limit time or more and less than a predetermined time, unlocks only the driver seat door lock 40*a*. The centralized control unit 39, when detecting an operation of the driver seat unlock sensor 31*a* for a predetermined time or more, unlocks the door locks 40 of all the doors 2 of the vehicle 1.

The lower limit time is, for instance, several tens of milliseconds (such as 50 ms). The predetermined time is, for instance, several seconds (such as 3 s). The centralized control unit 39 performs addition while each unlock sensor 31 is in an operative condition, and performs subtraction while each unlock sensor 31 is in a non-operative condition, then when calculated accumulation value reaches a predetermined time, the centralized control unit 39 determines that the predetermined time has elapsed.

It is to be noted that the centralized control unit 39, when detecting an operation of the unlock sensor 31 at a door 2 other than the door 2*a* of the driver seat and detecting establishment of communication between the mobile device 11 carried by an operator and the transmitter 34, the receiver 35 in a predetermined communication range in the vicinity of the vehicle 1 in a state where all the doors 2 are detected to be locked, unlocks the door locks 40 of all the doors 2 of the vehicle 1 irrespective of whether a predetermined time has elapsed.

As illustrated in FIG. 3, the centralized control unit 39, when detecting an operation of the driver seat unlock sensor 31*a* for a lower limit time or more and less than a predetermined time in a state where only the door 2*a* of the driver seat is detected to be unlocked, locks the driver seat door lock 40*a*. The centralized control unit 39, when detecting an operation of the driver seat unlock sensor 31*a* for a predetermined time or more, unlocks the door locks 40 of all the doors 2 of the vehicle 1.

As illustrated in FIG. 3, the centralized control unit 39, when detecting an operation of the driver seat unlock sensor 31*a* for a lower limit time or more in a state where all the doors 2 are detected to be unlocked, unlocks the door locks 40 of all the doors 2 of the vehicle 1.

The centralized control unit 39, when detecting that doors 2 including at least the door 2*a* of the driver seat is in a locked state and the mobile device 11 is present in a predetermined communication range in the vicinity of the door 2*a* of the driver seat, causes only the driver seat door handle illumination light 41*a* to light up. Subsequently, the concentrated control unit 39, when detecting an operation of the driver seat unlock sensor 31*a* for a predetermined time or more, causes the door handle illumination lights 41 at door handles 3 other than the door handle 3*a* of the driver seat to light up.

The centralized control unit 39, when detecting an operation of the driver seat unlock sensor 31*a* for a lower limit time or more and less than a predetermined time, performs an unlock operation on the driver seat door lock 40*a* and causes only the driver seat heater 42*a* to operate. The centralized control unit 39, when detecting an operation of the driver seat unlock sensor 31*a* for a predetermined time or more, performs an unlock operation on all the door locks 40 and causes all the seat heaters 42 to operate.

The centralized control unit 39 changes the setting value for setting item(s) including at least one of a predetermined time and a control mode of the door lock 40 according to the predetermined time, based on a signal outputted from the input unit 38. As setting items for the control mode of the door lock 40, the centralized control unit 39 has an item that allows individual setting of private mode under the precondition that only an operator uses the vehicle 1, and public mode under the precondition that individuals other than an operator uses the vehicle 1. The centralized control unit 39, when detecting an operation of the driver seat unlock sensor 31*a* for a lower limit time or more and less than a predetermined time, performs an unlock operation on the driver seat door lock 40*a* and causes a predetermined in-vehicle device to operate in the private mode. The centralized control unit 39, when detecting an operation of the driver seat unlock sensor 31*a* for a predetermined time or more, performs an unlock operation on all the door locks 40 and causes a predetermined in-vehicle device to operate in the public mode.

For instance, when voice answer back is performed along with an unlock operation of the door locks 40, the centralized control unit 39 individually sets the voice in the private mode and the voice in the public mode. At the time of operation in the private mode, the centralized control unit 39 performs answer back in the voice set in the private mode, and at the time of operation in the public mode, the centralized control unit 39 performs answer back in the voice set in the public mode.

As described above, with the smart entry system 10 according to the embodiment, it is possible to clearly determine the intention of an operator to switch between unlocking of only the door 2*a* of the driver seat and unlocking of all the doors 2, according to one of different operative conditions for the single driver seat unlock sensor 31*a*. Thus, operability is ensured which is easy to understand for an operator and in which the intention of an operator and the behavior of the vehicle 1 do not differ while the security performance is ensured. In addition, since all the doors 2 are unlocked according to an operation of the unlock sensors 31 other than the driver seat unlock sensor 31*a*, usability at places other than the driver seat such as loading and unloading of baggage may be improved.

Furthermore, the centralized control unit 39 is provided that determines elapse of a predetermined time by an accumulation value which is calculated by performing addition and subtraction according to operative or non-operative condition of each unlock sensor 31. Thus even when detection of an operative condition is momentarily lost due to noise or momentarily reduced contact force, it is possible to protect against resetting operation time extension. Thereby, even after detection of an operative condition is momentarily lost, when the operation is continued, a predetermined time may be immediately reached and desired operativity may be ensured.

Furthermore, when welcome treat is provided by the door handle illumination light 41, only the driver seat door handle illumination light 41*a* is lit up at normal time. When it is estimated that an occupant also get on through another door 2, welcome treat is also provided by another door handle illumination light 41, and thus both power saving at normal time and hospitality for another occupant are achieved. Furthermore, when the seat heaters 42 are preheated, seat heater(s) 42 to be operated is switched according to switching between unlocking of only the door 2*a* of the driver seat and unlocking of all the doors 2, and thus power saving and hospitality for another occupant are achieved.

Furthermore, the centralized control unit 39 is provided that changes at least one of a predetermined time and a control mode of the door lock 40 according to the predetermined time, based on an operation of the input unit 38 or the mobile device 11 by an operator, and thus easy-to-understand setting for an operator is made possible. Furthermore, when it is estimated that an occupant other than the driver is present, the control mode of the door locks 40 is switched to the public mode, and thus even when highly hobby-like setting is made in customized items in the private mode, such as types of voice guidance, there is no possibility of giving a sense of discomfort to another occupant.

Hereinafter, a modification of the aforementioned embodiment will be described. In the embodiment described above, each of the unlock sensors 31 is a mechanical switch. However, without being limited to this, the unlock sensors 31 may be, for instance, a capacitance type touch sensor.

In the embodiment described above, the centralized control unit 39, when detecting an operation of an unlock sensor 31 and detecting establishment of communication between the mobile device 11 and the transmitter 34, the receiver 35, controls the operation of the door locks 40. However, without being limited to this, the centralized control unit 39 may control the operation of the door locks 40 by adopting one of the cases where establishment of communication is detected before an operation of the unlock sensor 31 is detected and where an operation of the unlock sensor 31 is detected then establishment of communication is newly detected. Also, the centralized control unit 39 may detect establishment of communication in two steps by providing different communication ranges before and after the detection of an operation of the unlock sensor 31. The centralized control unit 39 may detect establishment of communication in a relatively large communication range in the periphery of the vehicle 1, for instance, before the detection of an operation of the unlock sensor 31, and may detect establishment of communication in a relatively small communication range in the periphery of the door handle 3, for instance, after the detection of an operation of the unlock sensor 31.

In the embodiment described above, the centralized control unit 39 changes the setting value for setting item(s) including at least one of a predetermined time and a control mode of the door lock 40 according to the predetermined time, based on a signal outputted from the input unit 38. However, without being limited to this, the centralized control unit 39 may change the setting value for setting item(s) including at least one of a predetermined time and a control mode of the door lock 40 according to the predetermined time, for instance, based on a signal outputted from a mobile terminal carried by an operator. The mobile terminal performs wireless communication with the in-vehicle system 12 of the vehicle 1 by, for instance, short distance wireless communication such as Bluetooth (registered trademark) or wireless local area network (LAN) such as Wi-Fi (registered trademark).

In the embodiment described above, the in-vehicle system 12 includes a plurality of door handle illumination lights 41 and seat heaters 42. However, without being limited to this, at least one of the plurality of door handle illumination lights 41 and seat heaters 42 may not be provided.

In the embodiment described above, the in-vehicle system 12 may include an answer back unit that performs answer back to an operator who is present outside the vehicle 1 by a visible operation or an audible operation in a recognizable manner to the operator. The answer back unit is, for instance, a light that lights up or blinks as a visible operation, or a speaker that outputs an electronic sound as an audible operation. The centralized control unit 39 may cause the answer back unit to operate when an operation confirmation time has elapsed, which is shorter than a predetermined time and which allows detection of an operation of the unlock sensor 31 for less than a predetermined time to be effective, and may cause the answer back unit to operate again when the predetermined time has elapsed. For answer back that outputs, for instance, an electronic sound (such as "pi"), the centralized control unit 39 may provide different electronic sounds for the elapse of the operation confirmation time and for the elapse of the predetermined time. According to the modification, an operator is able to recognize that input to an unlock sensor is confirmed due to elapse of the operation confirmation time and the detail of unlock operation is switched due to elapse of the predetermined time. Consequently, the operability is further more reliably ensured in which the intention of an operator and the behavior of the vehicle do not differ.

The embodiments of the present disclosure are presented as examples and are not intended to limit the scope of the disclosure. The embodiments may be implemented in various other forms and various omissions, replacements, and modifications may be made in a range without departing from the gist of the disclosure. The embodiments and their modifications are included in the range and gist of the disclosure, and similarly, are included in the disclosure described in the appended claims and the scope of the equivalents.

What is claimed is:

1. A smart entry system comprising:
    an unlocking mechanism provided with doors of a vehicle, the doors comprising a first door for driver seat and a second door for passenger seat;
    an unlock sensor that is provided to a door handle of the first door for driver seat and that detects a continuous operation by a user for unlocking the first door;
    another unlock sensor that is provided to a door handle of the second door for passenger seat and that detects an operation on the another unlock sensor by the user for unlocking the second door;
    a mobile device carried by the user; and
    a controller that determines a length of detection time of the continuous pressing operation on the unlock sensor of each of the first door and the second door during which the corresponding unlock sensor detects the continuous pressing operation by the user and that determines establishment of a communication between the vehicle and the mobile device in a predetermined communication range in a vicinity of the vehicle, the controller being configured to control the locking mechanism based on the length of detection time and the establishment of the communication,
    wherein the controller is further configured to unlock only the first door when the length of detection time detected for the first door is less than a predetermined time and to unlock both the first and second doors when the length of detection time is the predetermined time or more, and
    wherein the controller is further configured to unlock both the first and second doors, regardless of the length of detection time detected for the second door, when the another unlock sensor detects the operation on the another unlock sensor by the user and the controller determines the establishment of the communication between the vehicle and the mobile device in a predetermined communication range in a vicinity of the second door.

2. The smart entry system according to claim 1,
    wherein the controller determines the length of detection time as an accumulation value calculated by adding a time of period during which the unlock sensor detects the operation by the user and by subtracting a time of period during which the unlock sensor does not detect the operation by the user.

3. The smart entry system according to claim 1, further comprising:
- a mobile device detector that periodically detects presence of the mobile device in a predetermined communication range in a vicinity of the first door of the driver seat; and
- door handle illumination devices that selectively illuminate the door handles of the first and second doors,
- wherein the controller controls the door handle illumination devices to illuminate only the door handle of the first door for driver seat when at least the first door is locked and the mobile device is detected in the predetermined communication range, and subsequently illuminate the door handle of the second door for passenger seat when the length of detection time for the first door is the predetermined time or more.

4. The smart entry system according to claim 1, further comprising
- a seat warmer that warms each of the driver and passenger seats of the vehicle,
- wherein the controller controls the seat warmer to warm only the driver seat when the length of detection time for the first door for driver seat is less than the predetermined time, and to warm both the driver seat and the passenger seat when the length of detection time for the first door for driver seat is the predetermined time or more.

5. The smart entry system according to claim 1,
- wherein the controller has a customization unit that changes a setting value for a setting item including at least one of the predetermined time and a control mode of the locking mechanism of the door according to the predetermined time, by communicating with a meter of the vehicle or a mobile terminal communicable with the vehicle.

6. The smart entry system according to claim 5,
- wherein the setting item comprises a private mode customized for a condition under which only the user is supposed to use the vehicle and a public mode customized for a condition under which the user and passengers other than the user are supposed to use the vehicle, and
- wherein the controller selects the private mode to operate when the length of detection time for the first door is less than the predetermined time, and selects the public mode to operate when the length of detection time for the first door is the predetermined time or more.

7. The smart entry system according to claim 1,
- wherein the vehicle includes an answer back unit that performs answer back to the user when the user is present outside the vehicle, the answer back comprising a visible operation or an audible operation in a recognizable manner to the user,
- wherein the controller determines whether the length of detection time for the first door reaches an operation confirmation time at which the controller determines that the length of detection time is less than the predetermined time, and
- wherein the controller controls the answer back unit to perform the answer back when the length of detection time reaches the operation confirmation time and then when the length of detection time reaches the predetermined time.

* * * * *